INVENTORS
ARTHUR GERALD DAULTON
ROBERT HELLER LAING

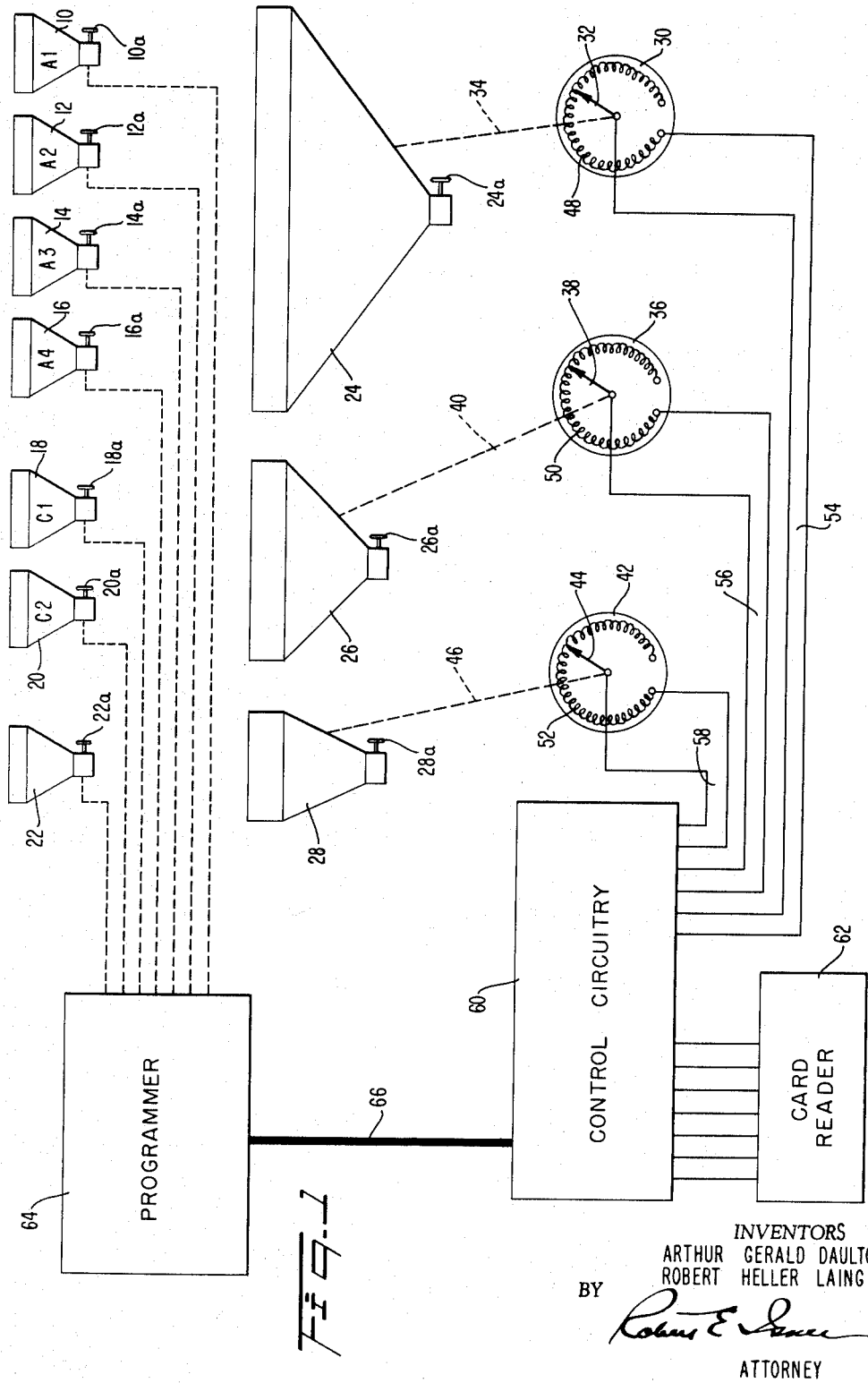

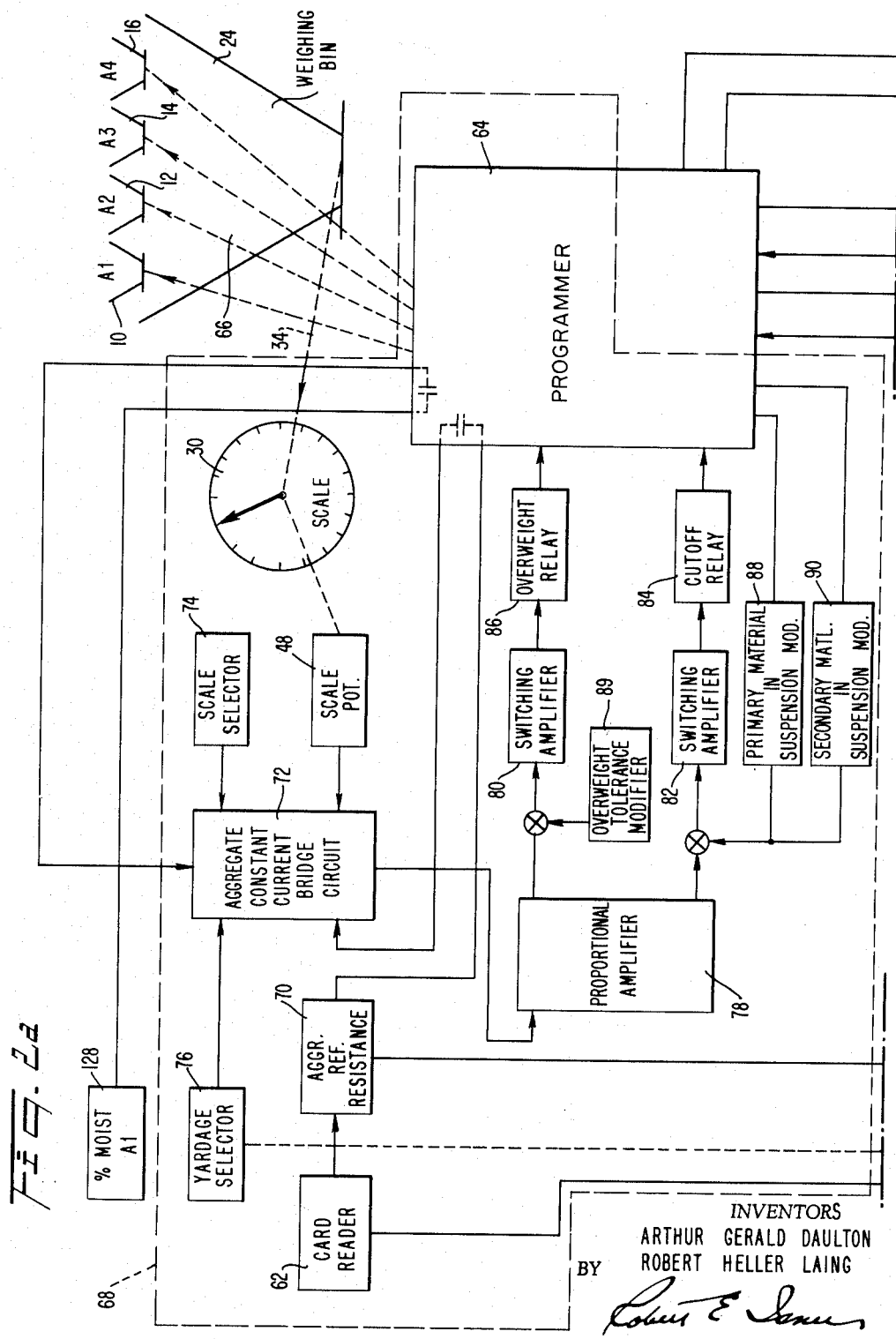

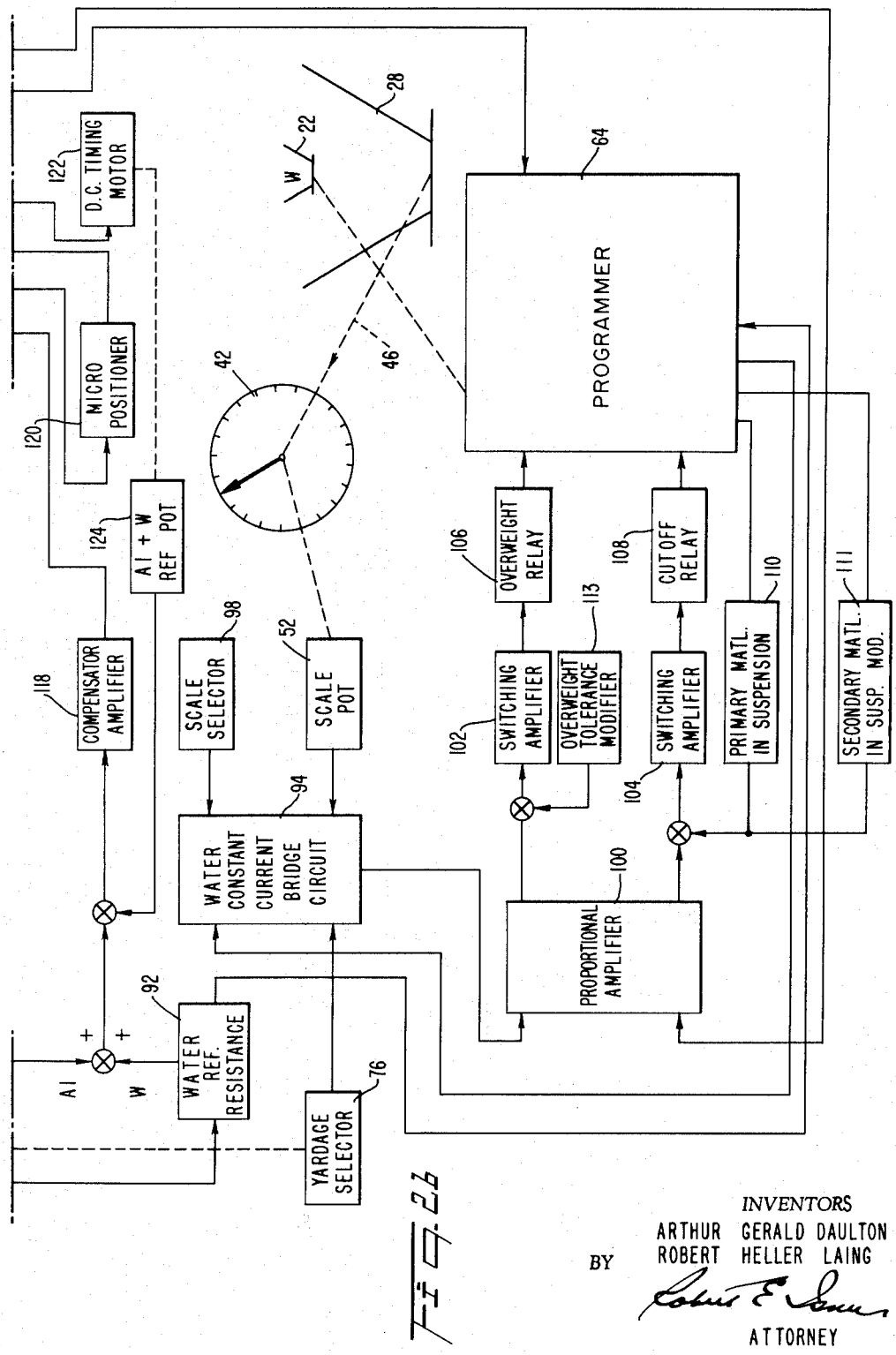

ATTORNEY

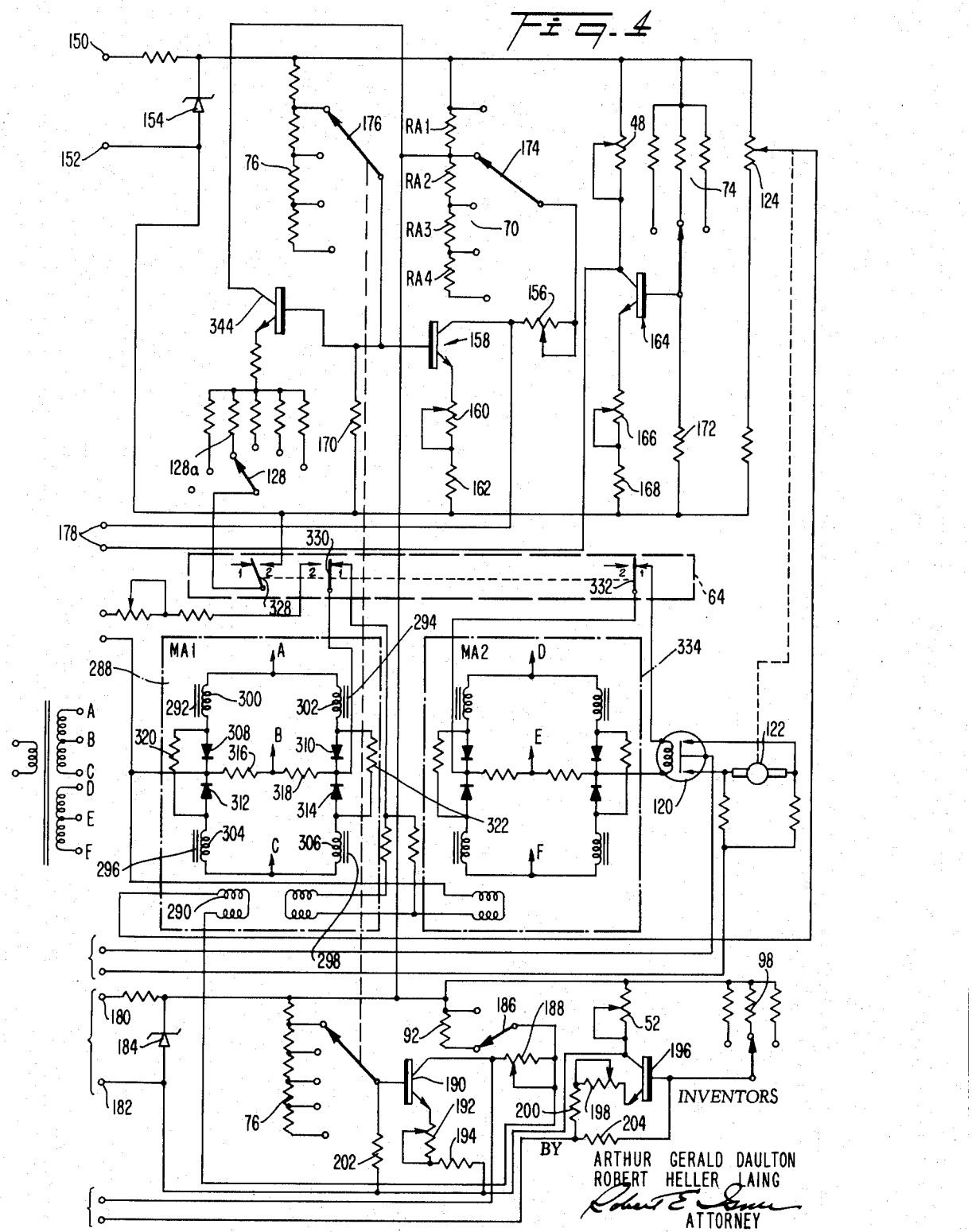

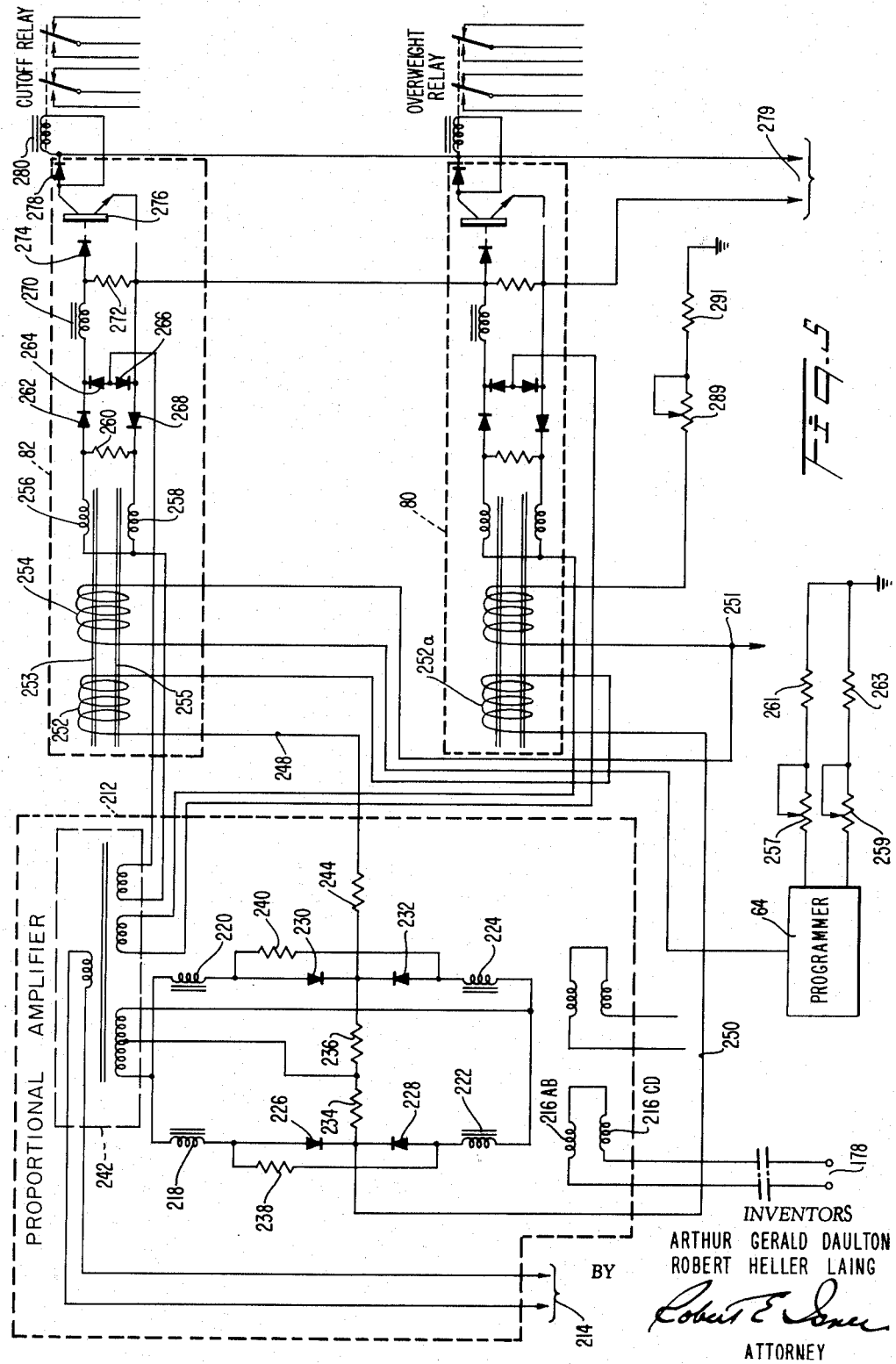

United States Patent Office 3,203,591
Patented Aug. 31, 1965

3,203,591
BATCH WEIGHING CONTROL UNIT
Arthur Gerald Daulton and Robert Heller Laing, Minneapolis, Minn., assignors to Magnetic Controls Company, Minneapolis, Minn., a corporation of Minnesota
Filed Mar. 27, 1962, Ser. No. 182,897
20 Claims. (Cl. 222—2)

This invention relates to batch weighing operations and particularly to an improved construction for a punch card controlled automatic batch weighing system for effecting transfer of predetermined desired quantities of a plurality of batching ingredients into receiving means.

Recent years have witnessed considerable efforts to automate batch weighing operations including the application of punch card control techniques thereto, particularly in the concrete batching field. Although these efforts have attained some degree of improvement, such has been sufficiently limited, due, at least in part, to the varied characteristics of existing batching plants, as to limit, if not preclude, economical and widespread adoption thereof.

The subject invention may be briefly described as a novel and improved punch card controlled automatic batch weighing control unit whose principal components are constituted so as to inherently accommodate widely varying batching plant characteristics and to provide a degree of automated flexibility that surpasses anything that, to our knowledge, has been heretofore attained by prior efforts in this field. In its broad aspects the subject invention includes a plurality of control circuits adapted to assure coincidence between the delivered and desired amounts of a plurality of batching ingredients and an automatically operable programmer to properly sequence and direct the various operations necessary to effect the delivery of the proper proportional and total quantities of the desired batch. Also included in the subject invention is a novel and improved low voltage constant current bridge circuit that is substantially unaffected by power source voltage fluctuations, is adapted to afford for the ready introduction of control variables and plant characteristic constants therein and to provide accurate response characteristics over a range of weight values that is normally encountered in batching installations; a punch card controlled reference system that permits utilization of standardized batch control cards that are prepunched for any desired batch proportions and number of ingredients on a unit basis; an associated yardage selector that permits quantity batching over a predetermined range in minimal predetermined increments; an improved integral electronic moisture compensation system that automatically compensates for the amount of moisture present in one or more batching ingredients and an improved material in suspension control system that serves to accommodate those portions of the delivered ingredients that are in transit from the supply hopper to the receiving means that is electronic in nature and functions with an equal degree of accuracy irrespective of the ingredient quantities being dispensed.

Among the advantages of the subject invention is a unitized construction that permits the accommodation of varying batching plant characteristics; the permitted location of control components remote from the ingredient containing and receiving components; the permitted standardization of batch control cards for any desired number of batch formulations on a unit basis with a consequent reduction in the number of cards required; the accommodation of any desired batch quantities of any desired formulation over a wide range of quantity values without diminution of accuracy; an increased degree of automation; and an automatic accommodation of the amounts of moisture present in batch ingredients as well as the permitted coupling of an analog to digital recording printing unit to the subject control unit to provide a printed record of each batching operation.

The primary object of this invention is the provision of an improved card controlled automatic batch weighing system.

Further objects of this invention are the provision of improved batch weighing system components adapted for utilization in an automated punch card controlled batch weighing system.

Other objects and advantages of the subject invention will be pointed out in the following specification and claims and will be apparent to those skilled in this art from the accompanying drawings, which illustrate the principles of the invention as the same are incorporated in a presently preferred embodiment thereof as adapted for utilization in a concrete batching plant or installation.

Referring to the drawings:

FIGURE 1 is a highly simplified schematic block diagram generally representative of the principal system components and the relationship thereof to the ingredient handling means in a concrete batching plant;

FIGURES 2a and 2b, in composite, are a more detailed schematic block diagram of certain of the control circuitry components that are more generally delineated in FIGURE 1;

FIGURE 4 is a circuit diagram illustrative of the preferred circuit components for two of the control circuits and the interrelationship therebetween for effecting automatic compensation for the presence of moisture in one of the batching ingredients;

FIGURE 5 is a circuit diagram illustrative of the preferred circuit components for a control amplifier system adapted for use with each of the control circuits.

Figure 3:
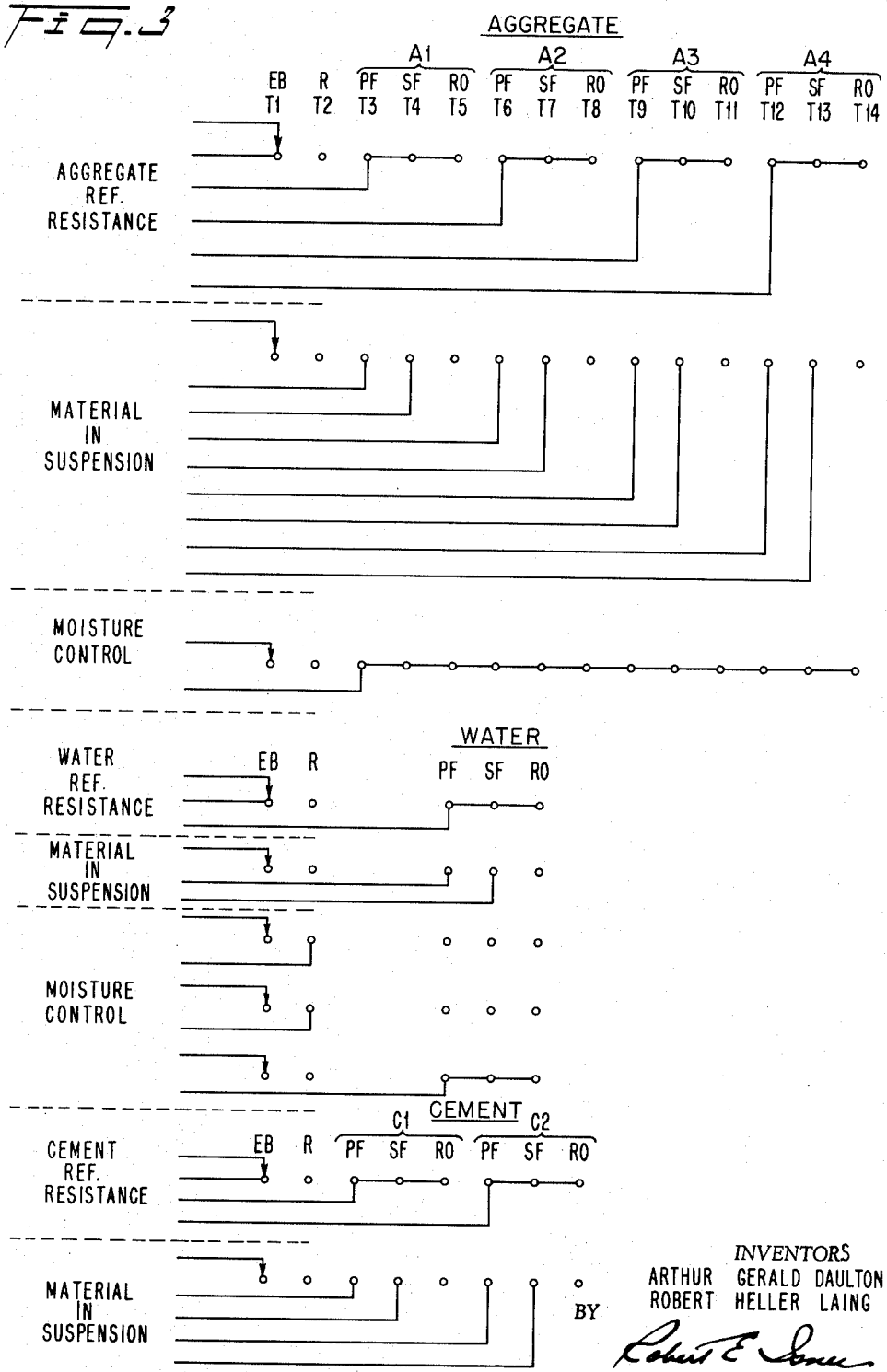
FIGURE 3 is a simplified schematic timing sequence diagram for certain principal operations performed by the various control circuits.

As indicated earlier, the subject invention may be of utility in effecting the automated batch weighing of a plurality of flowable ingredients irrespective of their particular identification. A particularly apt field of utilization lies in the batching of concrete and, pursuant to the mandate of the patent statutes, the remaining portions of this specification will be directed to the best mode contemplated by the inventors for carrying out their invention, specifically by the application thereof to a concrete batching plant operation.

Referring initially to FIGURE 1, there is delineated thereon, in schematic form, certain batching plant ingredient containing and handling components with which the subject invention is to be incorporated. Such components include a plurality of aggregate supply hoppers 10, 12, 14 and 16 for accommodating the storage of aggregates A1, A2, A3 and A4 respectively, of varying character. Removal of the aggregates from their respective supply hoppers is effected by means of individual gate or release valves 10a, 12a, 14a and 16a. The aggregate hoppers 10, 12, 14 and 16 are positioned to feed into a common receiving means 24, suitably an aggregate weighing hopper or bin, having a release gate or valve 24a. In addition to the above, the batching plant may include a pair of cement supply hoppers 18, 20 for handling two different cements C1 and C2, each having its own release gate or valve 18a and 20a and a water supply hopper 22 with its individual release gate or valve 22a. As illustrated, the cement hoppers 18, 20 empty into a common receiving means 26, suitably a cement weighing hopper or bin having a release gate 26a and the water hopper 22 empties into a water weighing bin or hopper 28 having its release gate or valve 28a.

Each of the aforesaid gate or release valves 10a, 12a, 14a, 16a, 18a, 20a and 22a are adapted to provide for a primary or rapid flow rate and a slow secondary flow rate in the nature of a so-called "dribble feed" as effected, for example, by chattering, or otherwise varying a comparatively small flow opening. Each of these valves or release gates are preferably of such nature as to be electrically actuated or controlled as by solenoids or other electrically actuated instrumentality or are such as to be adapted to such type of actuating control.

The ingredient receiving hoppers 24, 26 and 28 are adapted to be supported on individual weighing devices, not shown, such as a beam scale or load cell system, arranged to provide an indication of the weight of the contents thereof. Such indication may readily be provided, for example, by the scale dials 30, 36 and 42 and the associated pointers 32, 38 and 44 respectively, linked as represented by the dotted lines 34, 40 and 46 to the aforementioned individual weighing devices.

The batching plant components described above are of essentially conventional construction as found in existing facilities, save perhaps for the number of ingredient supply hoppers shown on the drawings. Numerous cement batching plants will have a fewer number of supply hoppers than that illustrated. However, the illustrated number is intended to serve to demonstrate the inherent flexibility of the subject invention through its ready adaptability, as hereinafter described, to installations having facilities for handling a greater or lesser number of ingredients.

Each of the receiving means weighing scales is provided with a transducer to convert the sensed weights of ingredients disposed in the receiving means into an electrical indication having a magnitude that is proportional to the sensed values. Specifically such transducers may suitably consist of low torque potentiometers, generally designated 48, 50 and 52, associated with the scale dials 30, 36 and 42 respectively and connected to the control circuitry 60 by lines 54, 56 and 58.

The control circuitry, generally designated 60 in FIGURE 1, will be described in detail hereinafter. Further input to such control circuitry 60 is effected by a punch card reading unit 62 of conventional construction and of the type wherein spring loaded contacts provide closures through prepunched and selectively located openings in a standard punch card to an associated printed circuit board.

In the subject invention the ingredient proportions or formula for a given mix are punched into a card on a one yard dry weight basis, conveniently termed "unit proportions," irrespective of the batch size that is required. Such unit proportion punch card designations are utilized, through the medium of a card reader, to automatically and selectively interconnect selected resistors in decade banks of precision resistors, not shown, to provide a plurality of precision resistance values for each batch ingredient whose magnitudes are proportional to the unit proportions of the desired mix.

Also associated with the control circuitry 60 is a program programmer or sequencing unit, generally designated 64 through which electrical signals are supplied via the lines 66 to the electrical instrumentalities for actuating the supply hopper release gates or valves 10a, 12a, 14a, 16a, 18a, 20a and 22a. The programmer 64 is a cyclically operable unit of essentially conventional basic construction and serves as a timing and transfer device to properly sequence the various operational steps and circuit interconnections involved. The details of such unit will not be herein described in detail, although reference will be made to certain sequencing and switching operations performed thereby that are necessary for an understanding of the subject invention. It will be understood that such a programming device 64 will perform additional related functions and switching operations such as operation checking, interlocking, switching of auxiliary visual indicia and the like as well as providing for a convenient location for the connection of an auxiliary printing device.

In the illustrated system, the subject invention is adapted under the control of the programmer 64 to automatically effect the controlled sequential displacement of the aggregates A1, A2, A3 and A4 from their respective supply hoppers 10, 12, 14 and 16 into the common aggregate receiving means 24. In a similar mannner the cements C1 and C2 are sequentially displaced from their supply hoppers 18 and 20 into the cement receiving bin 26 and the water is transferred from the supply hopper 22 into the receiving means 28. The subject system is conveniently arranged, through the programmer 64, to effect the controlled transfer of the cement C1 and C2 simultaneously with the transfer of the aggregates, for example cement C1 may be transferred simultaneously with aggregate A1 and cement C2 may be transferred simultaneously with aggregate A2. In a similar manner the water may be transferred coincidentally with the aggregate A3 or coincidentally with the transfer of cement C1 and aggregate A1 or cement C2 and aggregate A2. Such flexibility of operation is controlled by the programmer 64, which can be preprogrammed in any desired mannner so as to accommodate for the particular characteristics of a given batching plant.

FIGURES 2a and 2b, to which we now turn, schematically illustrate in somewhat more detail the nature of the control circuitry. Specifically illustrated thereon are the principal circuit components for the aggregate control circuit, the water control circuit and certain interlinking components of the moisture compensating system. The control circuit for the cement ingredients has not been shown in the interest of brevity, it being understood that such cement control circuit is essentially a duplicate of the illustrated and hereinafter described aggregate control circuit, less the moisture compensation components thereof.

Referring to FIGURE 2a, the components disposed within the dotted line 68 constitute what may conveniently be designated as the aggregate control circuit. As illustrated, such control circuit includes that portion of the card reader 62 that is responsive to the punch card designations representative of the unit proportions of the aggregate ingredients A1, A2, A3, A4 of a given formula or mix. The card reader 62, through selective switch closures, serves to selectively interconnect individual precision resistors prearranged in decade banks thereof to provide for a plurality of precision resistance values, hereinafter designated RA1, RA2, RA3 and RA4 respectively, whose magnitudes are proportional to the unit proportions of the aggregates A1, A2, A3 and A4 in the desired mix. These resistance values may be conveniently termed as the aggregate reference resistance 70. The aggregate reference resistance values are introduced, in proper sequence, by a suitable sequencing switch included in the programmer 64, into the aggregate comparison circuit, specifically the aggregate constant current bridge circuit 72. Also connected into the aggregate bridge circuit 72 is the aggregate weighing bin scale potentiometer 48, a scale selector 74 and a yardage selector 76. The scale selector 74 is suitably a modifying resistance which serves to modify the bridge 72 in accordance with the capacity of the particular scale or other weighing device used for weighing the aggregate in a given installation. Such scales are usually of such nature as to accommodate the maximum amount of material that would be weighed out in the plant and will vary from one plant to another. The scale selector 74 thus permits ready adaptation of the circuit to the existing scale facilities and capacity.

The yardage selector 76 is generally in the nature of a multiplier and serves to modify the output signal of that portion of the bridge 72 with which the aggregate reference resistance 70 is associated in accordance with the total quantity of the desired batch or mix. The yardage selector 76 suitably comprises a 32 position rotary selector switch arranged to provide a predetermined series of selectable fixed resistance values and preferably is so constituted as to accommodate switch settings representative of batch totals in ¼ yard increments for batches running ¼ to 6 yards in total quantity and in ½ yard increments for batches running from 6 to 10 yards in total quantity.

The aggregate bridge circuit, as will be described in detail hereinafter, serves to compare the desired weight of an aggregate ingredient to be included in a given batch formulation with the actual weight thereof disposed within the receiving means 24 and to provide an output voltage signal whose magnitude is proportional to the magnitude of the difference between the desired weight and the sensed weight thereof.

The output of the aggregate bridge 72 is connected to a proportional amplifier 78. The proportional amplifier 78 is preferably constituted by a pair of high frequency magnetic amplifiers having a very small time delay connected in push-pull relation which serve to amplify the unbalance signal output of the bridge. The output of the amplifiers 78 is applied to a pair of switching amplifiers 80 and 82, preferably switching type magnetic amplifiers, which serve to operate a pair of relays designated the overweight relay 86 and the cutoff relay 84 respectively. The switching amplifier 82 and cutoff relay 84 function as an automatic switching mechanism during normal fill operations when batch ingredient material is being transferred from a supply hopper to the receiving means 24. The cutoff relay 84, which is normally in an energized condition, serves as a cutoff switch, becoming deenergized when the magnitude of the bridge output signal decreases to a predetermined low value such as would result by an approaching coincidence between the desired weight and sensed weight of the aggregate ingredient undergoing transferral. Such relay deenergization is utilized, through the programmer 64, to effect closure of the supply hopper gate. The switching amplifier 80 and relay 86 serve as an overweight control to halt further operations if the bridge 72 output goes past a balance position, indicative of the transfer of a greater amount of a batch ingredient than desired. Such condition will effect the reversal of the bridge output signal which in turn will effect energization of switching amplifier 80 and actuation of the overweight relay 86. Actuation of the overweight relay 86 will initiate an interlock within the programmer 64 to halt the sequence of operations and to provide an attention arresting indication that corrective steps must be taken before the automatic sequencing can continue.

In order to provide for an extremely close degree of control between the amounts of ingredients delivered from the supply hoppers to the receiving means and to accommodate the material that is in suspension intermediate the supply hopper gates and the receiving means at the instant of gate closure there are provided a pair of material in suspension modifiers designated as the primary and secondary material in suspension modifiers 88 and 90 respectively. These modifiers 88 and 90 which suitably constitute resistance values proportioned in accordance with the installation characteristics such as the rate of ingredient flow for primary and secondary fill operations, the unit weight of the ingredient being transferred and the distance intermediate the supply hopper gate and the receiving means, are connected through the programmer 64 to bias the switching amplifier 82 in such manner as to effect deenergization of the cutoff relay 84 and consequent closure of the hopper gate at the proper instant of time to assure that the sensed weight of material in the receiving means plus the material in suspension equals the desired cut off weight for primary fill operations, say at 80% of the total weight, and the desired weight for secondary fill operations. A similar overweight tolerance modifier 89 is provided for the switching amplifier 80.

In the subject invention a separate control circuit is provided for the cement ingredients in the desired batch and for the water ingredient necessary for the formulation of concrete. The water control circuit is schematically designated on FIGURE 2b and is essentially similar to the above described aggregate control circuit. As illustrated, the water control circuit includes that portion of the card reader 62 adapted to sense the punched designations representative of the unit proportion of water in the desired batch and select the value of the water reference resistance 92 for inclusion, through that portion of the programmer 64 directed to the water control circuit sequencing and water supply hopper gate 22a control, in the water constant current bridge circuit 94. Also feeding into the bridge 94 are the water receiving means scale potentiometer 52, a scale selector 98 and the yardage selector 76. These components are similar to and function in a manner similar to the corresponding components for the aggregate control circuit identified and described above. The water constant current bridge 94 serves to compare the desired weight of water to be included in a given batch formulation with the actual weight thereof disposed within the water receiving means 28 and to provide an output voltage signal whose magnitude is proportional to the magnitude of the difference between the desired weight and the actual weight thereof.

The output signal from the water constant current bridge 94 is applied to a proportional amplifier 100 whose output is in turn applied to a pair of switching amplifiers 102, 104 which serve to operate a pair of relays designated as the overweight relay 106 and cutoff relay 108. The structure and functioning of the proportional amplifier 100, the switching amplifiers 102, 104 and the overweight and cutoff relays 106 and 108 are essentially the same as the similarly identified components in the aggregate control circuit identified and described above. Also included in the water control circuit are a primary material in suspension modifier 110, a secondary material in suspension modifier 111 and an overweight tolerance modifier 113. The modifiers 110, 111 which may suitably constitute resistance values proportioned in accordance with the installation characteristics such as the rate of water flow for primary and secondary fill operations, the unit weight of water and the transfer distance, are connected through the programmer 64 to bias the switching amplifier 104 in such manner as to effect deenergization of the cutoff relay 108 and consequent closure of the water hopper gate 22a at the proper instance of time to assure that the sensed weight of water in the receiving means 28 plus the water in suspension equals the desired cutoff weight for primary fill operations and the desired total weight for secondary fill operations.

As mentioned earlier, the drawings do not include any showing of the cement control circuit for effecting the sequential controlled transfer of the required quantities of cements C1 and C2 into the cement receiving means 26. Such cement control circuit is substantially identical with the aggregate control circuit described above insofar as component elements and functioning thereof is concerned. It should be clearly understood, however, that the subject unit includes a control circuit for the controlled transfer of the cement ingredients of the batches.

In the batching of concrete most sand type aggregates contain an appreciable amount of surface water. Such surface water must be corrected for in order to formulate a desired mix since the batch formulation as punched on the control cards is on a dry weight basis. Broadly speaking, the subject moisture compensation control system is based on the fact that the sum of aggregate A1 (for example) and water will be the same both before and after compensation and such constant relationship is utilized as the system reference for the compensation control.

The system reference is provided by means of a null seeking servo loop connected intermediate the aggregate and water reference resistances 70 and 92. This null seeking servo loop includes a compensator amplifier 118 connected through the programmer 64 to a micropositioner 120, which in turn is connected through the programmer 64 to a direct current timing motor 122. The timing motor 122 is mechanically linked to an aggregate plus water reference potentiometer 124 which in turn is connected to the input of the compensator amplifier 118. In such circuit arrangement a voltage is derived from the aggregate and water reference resistances 70, 92 that is proportional to the dry weights of one aggregate A1 plus water and such voltage is utilized to set the $A1+W$ reference potentiometer 124 after which the servo loop is opened by the programmer 64.

The percent of surface moisture present in a given aggregate is readily determined by suitable probes located in the supply hopper. As will be explained hereinafter, the indicated percent moisture correction is introduced into the aggregate bridge circuit 72 through the programmer 64 by the percent moisture modifier 128. The connection is such as to modify the level of current flow through the aggregate reference resistance 70 by a percentage corresponding to the percentage moisture correction required. Such modification of the aggregate bridge circuit results in the delivery of an increased amount of moist aggregate sufficient to assure coincidence between the desired and delivered amounts thereof on a dry weight basis. Since, however, water is now being delivered with the aggregate, the amount of water delivered from the water supply hopper 22 must be decreased in such amount that the sum of the water delivered from the supply hopper 22 and the water delivered with the aggregate be equal to the amount of water desired for the particular batch being made up. Such is effected by modifying the water control circuit as follows. The above mentioned change in current flow through the aggregate reference resistance 70 results in an unbalance in the input to the compensator amplifier 118 that is proportional to the weight added. The output of the compensator amplifier 118 resulting from said unbalance is applied, though the programmer 64 during the portion of the program when the water is being transferred, to the water control circuit proportional amplifier 100 with such polarity as to effect an earlier deenergization of the cutoff relay 34 and to thereby reduce the weight of delivered water in direct proportion to the increase in aggregate weight.

FIGURE 4 illustrates the detailed circuitry of the constant current bridges 72, 96 of the aggregate and water control circuits together with the various components which effect the operation thereof and the associated moisture control system circuitry. FIGURE 5 illustrates suitable detailed circuitry of the circuit components responsive to the bridge output signals.

Referring first to FIGURE 4, the aggregate constant current bridge 72 is connected across a regulated D.C. power supply represented by the terminals 150, 152 in parallel with a zener diode 154 which provides for additional voltage regulation. One arm of said bridge is constituted by the aggregate reference resistance RA1, RA2, RA3, RA4, generally designated 70, a displaceable switch arm 174 physically located in the programmer 64 and a zero adjust potentiometer 156 disposed in the collector circuit of a transistor current regulator 158 and a reference current calibrate potentiometer 160 and fixed resistance 162 disposed in the emitter circuit thereof. The other bridge arm is constituted by the aggregate scale potentiometer 48 disposed in the collector circuit of a transistor current regulator 164 and a maximum scale value adjusting potentiometer 166 and a fixed resistance 168 disposed in the emitter circuit thereof. In the above described bridge circuit the zero adjust potentiometer 156 in the collector circuit of transistor 158 serves to compensate for the usually unavoidable end resistance in the aggregate scale potentiometer 48. The maximum scale adjust potentiometer permits calibration of the level of current flow through transistor 164 so that it can be made exactly equal to the current through transistor 158 at a given scale reading.

The base of transistor current regulator 158 is connected into a voltage divider network disposed across the power supply and which consists of the yardage selector resistances 76, the value of which is selectable by the manually positionable switch arm 176 of the earlier mentioned 32 position switch and a fixed resistance 170. The base of the transistor current regulator 164 in the second bridge arm is also connected to a voltage divider network disposed across the power supply and which consists of the aggregate scale selector 74 and fixed resistance 172.

In the described circuit, the transistors 158, 164 are heavily degenerated by the fixed resistances 162, 168 disposed in the emitter circuits to such an extent that relatively large resistance changes in the collector circuits thereof will not result in any substantial current change. Under such conditions all resistance inserted in the collector circuits will have, at any given level of current flow, a predictable amount of voltage drop thereacross and the bridge output is readily represented by a comparison voltage obtained from the collector circuits thereof as illustrated by the output terminals 178. In such circuits the voltage drop across the collector circuit resistances will be determined by the value of such resistances and by the amount of current flowing therethrough. The amount of current flow is readily controlled by varying the bias to the transistor current regulators 158, 164 through the base circuit voltage divider networks which include the yardage selector 76 and the aggregate scale selector 74.

In a given operation the unit proportions of the required aggregates will be established in response to the punched control card designations, and introduced into the bridge circuit as the aggregate reference resistances RA1, RA2, RA3 and RA4. The total batch quantity will be established by setting the switch arm 176 of the 32 position yardage selector switch which serves to introduce a predetermined amount of resistance into the voltage divider biasing network for transistor 158 to thereby set the level of constant current flow therethrough. In a similar manner the setting of the aggregate scale selector 74 will control the level of constant current flow through transistor 164 and the collector circuit resistance thereof will vary in accordance with the amount of aggregate delivered into the aggregate receiving means 24. Under these conditions and assuming switch arm 174 is positioned as illustrated at the commencement of delivery of aggregate A1, the bridge will be unbalanced with a predetermined voltage drop appearing across RA1. As the aggregate A1 is delivered from its supply hopper 10 into the aggregate receiving means 24, the aggregate scale potentiometer 48 will vary the amount of resistance in the collector circuit of transistor 164 producing a variation in the voltage drop thereacross. The magnitude of the voltage difference or unbalance appearing across output terminals 178 is proportional to the difference between the desired weight of aggregate A1 and the sensed weight thereof disposed in the receiving means 24 and such unbalance will decrease as the delivered amount approaches the desired amount.

The water control circuit, which is also illustrated on FIGURE 4, is essentially similar in both circuit arrangement and operation to the aggregate control circuit described above. Such water control circuit includes a water constant current bridge 96 connected across a regulated D.C. power supply represented by the terminals 180, 182 in parallel with a zener diode 184 which provides for additional voltage regulation. One arm of said bridge is constituted by the water reference resistance 92, a displaceable switch arm 186, physically located in the programmer 64 and a zero adjust potentiometer 188 disposed in the collector circuit of a transistor current regulator 190 and a reference calibrating potentiometer 192 and fixed resistance 194 disposed in the emitter circuit thereof. The other bridge arm is constituted by the water scale potentiometer 52 disposed in the collector circuit of a transistor current regulator 196 and a scale adjusting potentiometer 198 and fixed resistor 200 disposed in the emitter circuit thereof.

The base of the transistor current regulator 190 is connected into a voltage divider network disposed across the power supply and which consists of the yardage selector resistances 76 and a fixed resistance 202. The base of the transistor current regulator 196 in the second bridge arm is also connected to a voltage divider network disposed across the power supply and which consists of the water scale selector 98 and fixed resistance 204.

In this bridge circuit, as was the case with the aggregate bridge circuit, the transistors 190, 196 are heavily degenerated by the fixed resistances 194 and 200 disposed in the emitter circuits thereof to such an extent that relatively large resistance changes in the collector circuits thereof will not result in any substanial current change. As mentioned earlier, the operation of the water control circuit is essentially similar to that described in detail thereof for the aggregate control circuits and hence, in the interest of brevity, such operational explanation will not be here repeated.

The above described bridge circuits are possessed of numerous advantages. Included among such advantages are the fact that the voltage across the reference resistances is directly proportional to material weight which facilitates system scaling. The bridge voltages are extremely low, preferably less than 40 volts, which materially reduces the problem of arcing in the card reader and avoids the presence of hazardous voltages in the system. In addition to the above, the necessary splitting of the reference current, as will be described hereinafter, is accomplished in a low power level circuit with negligible effects due to loading. Such circuits only require that the amplifier gain and input impedance of the bridge responding components, to which we next turn, be maintained at a sufficient level to minimize bridge loading effects.

Preparatory to describing the moisture control system detailed circuitry it is believed that clarity will be served by a description of the additional basic control circuit components that are responsive to the outputs of the aggregate, water and cement constant current bridges. The bridge responsive components are all essentially similar in construction and operation and FIGURE 5, to which we now turn, may be considered exemplary thereof, as the same would be individually associated with each of the control circuit bridges.

Referring to FIGURE 5, the circuit details of a preferred construction for a proportional amplifier, such as the proportional amplifiers 78 and 100 and the similar unit that would be included in the cement control circuit, not shown, are contained within the dotted lines 212. Such unit, which is essentially a high frequency push-pull magnetic amplifier having its input series connected control windings 216AB and 216CD connected across a bridge output, such for example, the output terminals 178 of the aggregate control circuit constant current bridge 72. Input control winding 216AB is wound on common cores with gate windings 218, 220 and input control winding 216CD is wound on common cores with gate windings 222 and 224. The gate windings are connected through diode rectifiers 226, 228 and 232 into the so-called dummy resistance values 234, 236. Self-bias for the amplifer is obtained by resistors 238 and 240. The amplifer output appears across resistors 234 and 236 and is coupled, through coupling resistance 244 and lines 248, 250 to the series connected control windings 252 and 252a of a pair of switching amplifiers such as, for example, the switching amplifiers 80 and 82, as designated by the dotted lines, for the aggregate control circuit.

Voltage excitation for the above described proportional amplifiers and the associated switching amplifiers is obtained from a 2400 cycle inverter of conventional design, not shown, through input terminals 214 and distribution thereof is effected through distribution transformer 242.

The above described proportional amplifier serves to amplify, with minimum time delay, the D.C. unbalance output voltage of the constant current bridge and to apply such amplified unbalance voltage to the associated switching amplifier for the cutoff and overweight relays for the particular control circuit. As illustrated in FIGURE 5, the switching amplifiers associated with each proportional amplifier are of identical construction and hence, only one of such units will be described in detail.

As previously mentioned, the output of the proportional amplifier is applied to the control winding 252 of the cutoff control switching amplifier 82. Such control winding is commonly wound about cores 253, 255 and alternating current excitation is obtained from the distribution transformer over gate windings 256 and 258. Connected across the gate windings 256, 258 is a resistor 260 and a diode network including diodes 262, 264, 266 and 268. Bias to the unit is applied through a second control winding 254 connected intermediate a source of negative D.C. biasing potential 251 and, through the programmer 64, to the primary and secondary material in suspension modifying resistance, such as the potentiometers 257, 259, each connected in series with fixed resistors 261, 263. The switching amplifier as described above is connected through a filter choke 270 and a diode 274 to the base of a transistor 276 that is normally conducting during material transfer and having a suitable resistor 272 is connected intermediate the base and emitter circuit thereof. The collector and emitter circuits of said switching transistor are connected across a suitable D.C. potential source 279. The cutoff relay energization coil 280 and a transient suppressing diode 278 are included in said collector circuit.

In operation of the subject unit, the relay energization coil 280 is normally placed in an energized condition due to the application of a relatively large unbalance bridge output voltage to the proportional amplifier resulting from the initial large disparity between the desired weight and the actual delivered weight of an ingredient. As ingredient delivery is effected, such unbalance voltage will decrease and such decrease will, at a predetermined point determined by the bias resulting from the settings of the material in suspension modifiers, effect cutoff of transistor 276 and deenergization of relay coil 280 which in turn will shift the cutoff relay contacts to effect, through the programmer 64, closure of the delivery gate through which the ingredient is flowing.

If, for some reason, the desired cessation of ingredient delivery is not effected and the bridge output voltage passes through zero and reverses, the ingredient overweight relay such as 86 or 106 is caused to be actuated to halt operations and interlock the system. Such overweight control is effected through the overweight switching amplifier circuits associated with each proportional amplifier as illustrated in FIGURE 5. The overweight switching amplifier is of the same construction as the above described cutoff switching amplifier except that the control winding 252a is connected such as to render the overweight relay energization coil in a normally deenergized condition and to bias the circuit in such manner as to effect energization thereof in response to an overweight condition occasioned by the delivery of more than the desired amount of an ingredient. Such biasing is effected in part by the inclusion of an overweight tolerance modifier 288 formed of a variable and fixed resistance 289, 291 in order to preset the overweight control tolerance for an ingredient.

The foregoing has covered the basic nature of the control circuitry and the mode of operation thereof without consideration of the detailed circuitry for the moisture compensation system. The detailed circuitry for such system is illustrated on FIGURE 4 to which we now turn.

The previously mentioned null seeking servo loop includes the compensator amplifier 118 preferably formed of a pair of magnetic amplifiers, generally designated 288 and 334, arranged in push-pull relationship, a micropositioner 120, a D.C. timing motor 122 and the reference potentiometer 124. More specifically, the input control winding 290 of amplifier 288 is connected in series with aggregate reference resistor RA1, the water reference resistance 92 and the A plus water reference potentiometer 124. The control winding 290 is commonly wound with gate windings 300, 302, 304 and 306 on cores 292, 294, 296 and 298 in a manner similar to that described earlier in conjunction with the proportional amplifier. The gate windings work into rectifiers 308, 310, 312 and 314 with self-bias being provided by resistors 320, 322. Amplifier output is taken from across the dummy resistors 316, 318. Amplifier 334 is essentially of the same construction. Power for such amplifiers is obtained from transformer 324 connected as indicated by the lettered legends. The micropositioner 120 is a commercially available sensitive instrument type relay of the type in which selective relay actuation is effected in accordance with the direction of current flow through the coil thereof and such selective action is used to control the direction of rotation of the D.C. timing motor 122.

The setting of the reference potentiometer 124 is effected by having programmer located switches 328, 330 and 332 all disposed in position 1 closing the servo loop and having amplifier 288 driving amplifier 334 which in turn drives the micropositioner 120 to selectively rotate the D.C. timing motor 122. When so connected, the voltage appearing across aggregate reference resistance RA1 and water reference resistance 92 will be unbalanced with respect to the voltage across the reference potentiometer 124. Such unbalance voltage will drive the amplifiers 288, 334 in such manner as to selectively rotate the timing motor 122 to displace the reference potentiometer 124 in a direction to reduce the magnitude of the unbalance voltage. When the zero unbalance is reached, the voltage across the reference potentiometer will be equal and opposite to the voltage appearing across the aggregate and water reference resistances RA1 and 92. Under such condition a reference voltage for the system has been established since the weight of dry aggregate A1 plus water must be equal to the sum of the A1 aggregate and water weights after compensation.

Preparatory to the above operation it will be assumed that the dial of the percent water modifier switch 128 has been set in accordance with the amount of surface moisture present in the aggregate. Programmer switches 328, 330 and 332 are then switched to position 2. Such action opens the servo loop by isolating amplifier 334 from amplifier 288 and the micropositioner 120, connects amplifier 288 through resistors 350 and 352 and terminals 354 to the second input control winding of the water control circuit proportional amplifier 100 and connects transistor 344 across the agregate control circuit power supply through aggregate reference resistance RA1 and the selected percent moisture modifier resistance 128a. The resetting flow of current through the transistor 344 increases the voltage drop across RA1 and thus increases the desired weight of aggregate A1 by a fixed percentage corresponding to the setting made in the moisture modifier 128.

With programmer switch 330 in position 2, the amplifier 288 operates as a proportional amplifier to amplify the unbalance voltage now appearing at input control winding 290 that has resulted from the increased voltage drop appearing across aggregate reference resistance RA1. The amplified output of amplifier 288 serves to modify the input voltage to the proportional amplifier 100 in the water control circuit in such manner as to advance the water cutoff point the proper amount to assure that the weight of delivered water plus the weight of water in the delivered aggregate A1 is equal to the desired weight of water in the batch.

In the subject moisture control system the above desired result is obtained by effecting the moisture correction on a wet and not a dry weight basis. For example, if aggregate A1 contains 10% moisture and the batch formulation, as determined by the dry weight punch card unit proportions and yardage selector, requires 100 lbs. of A1 to be delivered on a dry weight basis, it is actually necessary to effect delivery of 111.1 pounds of the moisture containing aggregate. Such percentage correction is readily effected, and operator calculations avoided, by calibrating the percent moisture control resistances so as to effect the desired wet weight basis correction even though the control dial indicia therefor are such as to conform with the probe indicator. Under such circumstances the reference voltage drop produced across A1 is modified by the wet weight basis percentage correction. Since, however, the scaling used for both the water and aggregate channels is identical, the unbalance voltage resulting from the now moisture compensated voltage appearing across RA1 is compared with the voltage appearing across the reference potentiometer 124, as preset by the servo loop and the resulting unbalance voltage is fed to the amplifier 288. This latter unbalance voltage is directly proportional to pounds of water and is of a polarity such that, when combined with the output signal of the water constant current bridge in the proportional amplifier 100, it reduces the delivered water weight in direct proportion to the increase in aggregate weight.

As mentioned earlier in this specification, the programmer 64 serves as a timing, switching and transfer device to properly sequence the various operational steps and circuit interconnections involved in effecting the desired delivery of a batch of ingredients of predetermined quantity and predetermined proportions. FIGURE 3 is a highly simplified schematic timing sequence diagram representative of certain programmer sequenced switching operations that is illustrative of the timing relation of the principal control functioning performed by the heretofore described circuitry.

As illustrated on FIGURE 3, the programmer suitably includes a 10 bank 14 position sequencing switch with the switch positions designated as T1 through T14 respectively. It will be understood that the programmer 64 will perform additional related functions and switching operations; however, in the interest of clarity such additional control functioning will not be herein described.

In operation of the subject unit, the operator will select a punched card representative of the unit proportions of the desired batch ingredient on a dry weight basis and will insert such punched card in the card reader 62. The operator will also preset the yardage selector in accordance with the desired batch quantity and will also set the percent moisture modifier 124 in accordance with the probe readings indicative of the amount of moisture in the aggregate A1 which will be assumed to be a sand aggregate. At such time, all of the supply hopper gates will be closed and the subject unit will be ready to proceed through its sequence of operations.

At programmer switch position T1 an empty balance check is made of the ingredient receiving means 24, 26 and 28. If such empty balance check indicates that the various receiving means are properly in an empty condition, the programmer will proceed to the switch position T2. Position T2 is a reference position and suitable connections are made to close the circuit of the null seeking servo loop in the moisture control circuit in order to automatically position the $A1+W$ reference potentiometer 124. After the required setting of the reference potentiometer 124, the programmer stepping switch will advance to the T3 switch position. In such position the aggregate resistance 70 will be included in the aggregate control circuit and mechanically the aggregate reference resistance RA1 will be incorporated in the bridge circuits.

In addition, the gate valve 16a on aggregate A1 supply hopper 16 will be opened to effect a primary fill cycle for said aggregate A1. Coincidentally therewith, the primary fill material in suspension modifier 88 for the aggregate control circuit will be connected so as to bias the switching amplifier 82. Also at time T3, primary fill operations are initiated for cement C1 by inclusion of the cement reference resistance in the cement bridge circuit and the primary material in suspension modifier for the cement control circuit is connected to the switching amplifier included therein. If, as indicated, moisture control is to be effected in conjunction with aggregate A1, the switch position T3 also connects in the aggregate control circuit the percent moisture modifier 128.

At the completion of the primary fill operation for the aggregate A1 and cement C1, the respective gate valves 16a and 22a will close halting the further primary flow of material into the receiving means 24 and 28. As previously indicated, such primary fill operation will be cut off at a predetermined point in advance of delivery of the required amounts. For example, the cut off point may take place when 80% of the requisite amount of material has been delivered.

When such primary fill has been completed, the programmer stepping switch will move to position T4 in order to initiate the secondary fill operations. In such switch position the gate valves 16a and 22a for the aggregate and cement supply hoppers 16 and 22 respectively are suitably modified and chattered to provide for a dribble feed type of displacement of material therefrom into the respective receiving means. Concurrently therewith, the stepping switch will replace the primary material in suspension modifiers with the secondary material in suspension modifiers in the respective aggergate and cement control circuits. The secondary fill operations will continue until the aggregate and cement constant current bridges are brought into the requisite balance position at which time the cutoff release will be actuated and the hopper gate valves closed. At the completion of the secondary fill operations, the programmer stepping switch will advance to position T5 which, in the illustrated embodiment, is essentially a check and read out position to permit the operator to check and see, through a suitable visual indication, whether the desired operations have been correctly performed. After completion of the above described series of operations, the primary fill, secondary fill and read out cycles will essentially repeat themselves for the A2 aggregate, the water and the cement C2 and substantially for aggregates A3 and A4 during the remaining stepping switch positions. In the subject system, the cycle will be completed at switch position T14 which is a read out position for checking the requisite delivery of aggregate A4 after which the entire batch is discharged from the receiving means 24, 26 and 28 and the control system is returned to a condition for resumption of a further cycle of operation for either the same or different batch formulation. As will be apparent to those skilled in the art, a suitable interconnection can be made between the discharge switch for the various receiving means and a re-set control within the subject unit which will serve to automatically reset the control circuit for assumption of another cycle of operation.

Having thus described our invention, we claim:

1. In a system for effecting the delivery of selectively proportioned quantities of a plurality of ingredients to form a batch of predetermined formulation and quantity, an automatic control unit comprising a comparison bridge circuit, means responsive to a selected control media for defining an electrical quantity introduceable into said bridge circuit and representative of the proportional magnitude of a first ingredient in a desired batch, selectively settable means for conditioning said comparison bridge circuit in accordance with the total desired magnitude of said batch to provide a first electrical signal having a magnitude representative of the actual desired quantity of said first ingredient to be delivered, means included in said comparison circuit to provide a second electrical signal having a varying magnitude continually representative of the delivered amount of said first ingredient and means responsive to a comparison between said first and second electrical signals for effecting a control function relative to continuance of delivery of said first ingredient.

2. The control unit as set forth in claim 1 wherein said control media is a punched card.

3. In a system for effecting the delivery of selectively proportioned quantities of a plurality of ingredients to form a batch of predetermined formulation and quantity, an automatic control unit comprising a comparison bridge circuit, means responsive to a selected control media for defining an electrical quantity introduceable into said bridge circuit and representative of the magnitude of a first variable, selectively settable means for conditioning said comparison bridge circuit in accordance with the magnitude of a second variable to provide a first electrical signal having a magnitude representative of a predetermined relationship between said first and second variables, means for defining an electrical quantity representative of a magnitude of a third variable included in said comparison bridge circuit, means for conditioning said comparison bridge circuit in accordance with the magnitude of a fourth variable to provide a second electrical signal having a magnitude representative of a predetermined relationship between said third and fourth variables, and means responsive to comparison of said first and second electrical signals for effecting a control function relative to said third variable.

4. In a system for effecting the delivery of selectively proportioned quantities of a plurality of ingredients to form a batch of predetermined formulation and quantity, an automatic control unit comprising a comparison circuit, means responsive to a selected control media for defining an electrical quantity introduceable into said circuit and representative of the unit proportion of a first ingredient in the batch, selectively settable means for conditioning said comparison circuit in accordance with the total desired quantity of all ingredients to be included in said batch to provide a first electrical signal having a magnitude representative of the total required quantity of said first ingredient to be included in said batch, means included in said comparison circuit to provide a second electrical signal having a varying magnitude continually representative of the delivered amount of said first ingredient and means responsive to a comparison of said first and second electrical signals for effecting a control function relative to the continuance of delivery of said first ingredient.

5. In a system for effecting the delivery of selectively proportioned quantities of a plurality of ingredients to form a batch of predetermined formulation and quantity, an automatic control unit comprising a bridge circuit, means responsive to a selected control media for defining an electrical quantity introduceable into one arm of said bridge and representative of the magnitude of a first variable, selectively settable means for conditioning said arm of said bridge in accordance with the magnitude of a second variable to provide a first electrical signal having a magnitude representative of a predetermined relationship between said first and second variables, means included in a second arm of said bridge to provide a second electrical signal having a varying magnitude continually representative of the magnitude of a third variable and means responsive to a comparison between said first and second electrical signals for effecting a control function relative to said third variable.

6. The control unit as set forth in claim 5 wherein each of said bridge arms has a constant current characteristic.

7. In a system for effecting the delivery of selectively proportioned quantities of a plurality of ingredients to form a batch of predetermined formulation and quantity, an automatic control unit comprising a comparison unit, means responsive to a selected control media for defining a plurality of electrical quantities individually representative of the unit proportions of said plurality of ingredients in a desired batch, means for sequentially introducing said electrical quantities into said comparison unit, selectively settable means for conditioning said comparison circuit in accordance with the total desired quantity of all ingredients in said batch to provide a series of first electrical signals having magnitudes selectively representative of the desired quantities of each ingredient to be included in said batch, means included in said comparison unit to provide second electrical signals having magnitudes representative of the delivered amounts of each of said ingredients and means responsive to comparison of said first and second electrical signals for each said ingredient for effecting a control function relative to the delivery thereof.

8. In a system for effecting the delivery of selectively proportioned quantities of a plurality of ingredients to form a batch of predetermined formulation and quantity, an automatic control unit comprising a bridge circuit having constant current characteristics, means responsive to a selected control media for defining an electrical quantity introduceable into one arm of said bridge circuit and representative of a predetermined relationship between said settable means for conditioning said first arm of said bridge circuit in accordance with the magnitude of a second variable to provide a first electrical signal representative of a predetermined relatioinship between said first and second variables, means included in the second arm of said bridge to provide a second electrical signal having a varying magnitude continually representative of the magnitude of a third variable and means responsive to a comparison between said first and second electrical signals for effecting a control function relative to said third variable.

9. The control unit as set forth in claim 8 wherein each of said bridge arms includes a heavily degenerated transistor permitting collector circuit resistance variation without material current flow modification.

10. The control unit as set forth in claim 8 wherein said means for conditioning said first arm of bridge circuit includes means for controlling the level of constant current flow therethrough.

11. The control unit as set forth in claim 8 including a separate comparison circuit for each type of ingredient included in said batch, each comparison circuit being adapted to control the delivery of at least one ingredient of each type.

12. In a system for effecting the delivery of selectively proportioned quantities of a plurality of ingredients to form a batch of predetermined formulation and quantity, an automatic control unit comprising a bridge circuit each arm of which includes a heavily degenerated transistor to afford constant current flow therethrough, means responsive to a selected control media for defining an electrical resistance representative of the magnitude of a first variable introduceable into one arm of said bridge circuit, selectively settable means responsive to the magnitude of a second variable for controlling the level of constant current flow through said bridge arm to produce a first electrical signal having a magnitude representative of a predetermined relation between said first and second variables, means included in the second arm of said bridge for providing a second electrical signal having a magnitude representative of the magnitude of a third variable and means responsive to a comparison of said first and second electrical signals for performing a control function relative to said third variable.

13. The control unit as set forth in claim 12 wherein said first variable is the unit proportion of a particular ingredient, the second variable is the total batch quantity to be delivered and the third variable is the amount of delivered ingredient.

14. The control unit as set forth in claim 13 wherein the control function performed is the cessation of ingredient delivery in response to coincidence between the desired and delivered amounts of said ingredient.

15. The control unit as set forth in claim 4 wherein said last mentioined means includes means to compensate for the material in suspension at the time said control function is initiated.

16. A comparator bridge circuit comprising a first circuit having constant current characteristics, means for selectively introducing into said first circuit an amount of fixed resistance representative of the desired magnitude of a first variable quantity, means for selectively setting the level of constant current flow through said first circuit in accordance with the desired magnitude of a second variable quantity so that the voltage drop across said introduced resistance has a magnitude proportional to a predetermined relationship between the desired magnitudes of said first and second variable quantities, a second circuit having constant current characteristics, means for selectively introducing into said second circuit resistance values representative of the magnitude of a third variable quantity and means responsive to the magnitude of the difference between the magnitudes of the voltage drops across said introduced resistances in said first and second circuits for performing a control function relative to said third variable quantity.

17. A comparator bridge circuit comprising a first circuit including a heavily degenerated transistor to afford a substantially constant flow of current therethrough, resistance means representative of the magnitude of a first variable quantity introduceable into the collector circuit of said transistor, means for selectively setting the level of constant current flow through said resistance means in accordance with the magnitude of a second variable quantity to provide a first electrical signal having a magnitude proportional to the product of the magnitudes of said first and second variable quantities, a second circuit including a heavily degenerated transistor to afford a substantially constant level of current flow therethrough, resistance means representative of the magnitude of a third variable quantity introduceable into the collector circuit of said last mentioned transistor to provide a second electrical signal having a magnitude representative of the magnitude of said third variable quantity whereby a comparison of said first and second electrical signals is utilizable to perform a control function relative to said variables.

18. In a batch weighing system for effecting the delivery of desired quantities of first and second ingredients wherein said first ingredient contains an ascertainable proportion of said second ingredient mixed therein, an automatic control unit comprising means responsive to a control media for definining first and second electrical quantities representative of the magnitudes of the desired pure quantities of said first and second ingredients to be delivered, a first comparison circuit including said first electrical quantity for performing a control function when the sensed delivered quantity of said first ingredient corresponds to the desired quantity thereof, a second comparison circuit including said second electrical quantity for performing a control function when the sensed delivered weight of said second ingredient corresponds to the desired quantity thereof, means responsive to a comparison of said first and second electrical quantities for establishing a reference electrical quantity representative of the summation thereof, means responsive to the amount of said second ingredient included in said first ingredient and to said reference electrical quantity for complementally modifying the response characteristics of said first and second control circuits to have said first circuit perform its control function when the actual delivered quantity of said first ingredient in the mixture of said first and second ingredients corresponds with desired quantity thereof and to have said second circuit perform its control function when the sum of the quantities of said second ingredient mixed with said first ingredient and said second ingredient corresponds with the desired quantity thereof.

19. In a batch weighing system for effecting the delivery of desired quantities of first and second ingredients and which includes a pair of control media responsive comparison circuits adapted to perform control functions in response to coincidence between the desired pure weight and actual delivered weights of said ingredients, means to compensate for the presence of ascertainable amounts of said second ingredient in said first ingredient comprising means for establishing a reference electrical quantity representative of the sum of the desired quantities of said ingredients to be delivered on a pure basis, means settable in accordance with the amount of said second ingredient included in said first ingredient and responsive to the presence of said reference electrical quantity for modifying the response characteristics of said comparison circuits in such manner as to have said first comparison circiut perform its control function when the delivered quantity of said intermixed first and second ingredient is such as to contain a quantity of said first ingredient corresponding to the desired amount thereof and as to have said second control circuit perform its control function when the amount of said second delivered ingredient plus the amount thereof delivered with the first ingredient corresponds to the desired amount thereof.

20. A comparator comprising
a transistor having an emitter circuit and a collector circuit,
first resistance means introduceable into the collector circuit of said transistor representative of the magnitude of a first variable quantity,
second resistance means included in the emitter circuit of said transistor of a magnitude to effect substantially constant current flow through said transistor independent of variation in said first resistance means,
means included in said emitter circuit for selectively setting the level of constant current flow through said transistor and through said first resistance means in accordance with the magnitude of a second variable quantity to provide an electrical signal output having a magnitude proportionate to the product of the magnitudes of said first and second variable quantities.

References Cited by the Examiner

UNITED STATES PATENTS

| | | | |
|---|---|---|---|
| 2,431,058 | 11/47 | Manning | 222—52 |
| 2,787,402 | 4/57 | Stiner et al. | 222—76 |
| 2,923,438 | 2/60 | Logan et al. | 222—2 |
| 2,934,102 | 4/60 | Martin | 222—2 X |
| 3,089,122 | 5/63 | Sheehof et al. | 307—88.5–7 |
| 3,091,704 | 5/63 | Bashor et al. | 307—88.5–1 |

LOUIS J. DEMBO, *Primary Examiner.*

UNITED STATES PATENT OFFICE
CERTIFICATE OF CORRECTION

Patent No. 3,203,591                                                  August 31, 1965

Arthur Gerald Daulton et al.

It is hereby certified that error appears in the above numbered patent requiring correction and that the said Letters Patent should read as corrected below.

Column 6, line 55, after "includes" insert -- such --; column 7, line 34, for "though" read -- through --; column 11, line 9, for "the A plus" read -- the A1 plus --; line 57, for "agregate" read -- aggregate --; column 12, line 17, for "A1" read -- RA1 --; column 13, line 34, for "aggergate" read -- aggregate --; line 48, for "substantially" read -- subsequently --; column 15, lines 23 and 24, for "representative of a predetermined relationship between said" read -- representative of the magnitude of a first variable, selectively --; line 28, for "relatioinship" read -- relationship --; column 17, line 18, for "circiut" read -- circuit --.

Signed and sealed this 9th day of August 1966.

(SEAL)

Attest:

ERNEST W. SWIDER                                      EDWARD J. BRENNER
Attesting Officer                                            Commissioner of Patents